United States Patent
Leroy et al.

(10) Patent No.: US 9,221,551 B2
(45) Date of Patent: Dec. 29, 2015

(54) METHOD AND SYSTEM OF TRANSMITTING AND RECEIVING DATA ORIGINATING FROM AN AIRCRAFT BLACK BOX

(71) Applicant: Airbus (S.A.S.), Blagnac (FR)

(72) Inventors: Amaury Leroy, Maurepas (FR); Séverine Vermande, Cepet (FR)

(73) Assignee: Airbus (S.A.S.), Blagnac (FR)

( * ) Notice: Subject to any disclaimer, the term of this patent is extended or adjusted under 35 U.S.C. 154(b) by 0 days.

(21) Appl. No.: 13/891,629

(22) Filed: May 10, 2013

(65) Prior Publication Data

US 2013/0317673 A1    Nov. 28, 2013

Related U.S. Application Data

(63) Continuation of application No. PCT/FR2011/000605, filed on Nov. 14, 2011.

(30) Foreign Application Priority Data

Nov. 12, 2010 (FR) ...................... 10 59336

(51) Int. Cl.
*B64D 45/00* (2006.01)
*G08G 5/00* (2006.01)
*G07C 5/00* (2006.01)

(52) U.S. Cl.
CPC .............. *B64D 45/00* (2013.01); *G08G 5/0008* (2013.01); *G07C 5/008* (2013.01)

(58) Field of Classification Search
USPC .............................................. 701/14; 340/945
See application file for complete search history.

(56) References Cited

U.S. PATENT DOCUMENTS

| 7,085,562 B1 | 8/2006 | Holder et al. |
| 8,385,211 B2 | 2/2013 | Scarlatti et al. |
| 2004/0272555 | 2/2004 | Greenbaum |
| 2006/0276942 A1* | 12/2006 | Anderson et al. ............... 701/35 |
| 2007/0072639 A1 | 3/2007 | Frost et al. |
| 2009/0134981 A1* | 5/2009 | Shafaat et al. ................ 340/313 |

FOREIGN PATENT DOCUMENTS

| DE | 103 08 972 | 11/2003 |
| EP | 2 237 614 | 10/2010 |
| WO | WO 2012/062982 | 5/2012 |

* cited by examiner

*Primary Examiner* — Mary Cheung
*Assistant Examiner* — Yuen Wong
(74) *Attorney, Agent, or Firm* — Jenkins, Wilson, Taylor & Hunt, P.A.

(57) ABSTRACT

The invention relates to a method for transmitting data, characterized in that it includes a step of transmitting in-flight data between a first aircraft and at least a second aircraft, the data transmitted being data stored in at least one black box on board the first aircraft.

14 Claims, 4 Drawing Sheets

METHOD AND SYSTEM OF TRANSMITTING AND RECEIVING DATA ORIGINATING FROM AN AIRCRAFT BLACK BOX

CROSS-REFERENCE TO RELATED APPLICATIONS

This application is a continuation of PCT Application Serial No. PCT/FR2011/000605, filed Nov. 14, 2011, which claims priority to French Patent Application Serial No. 1059336, filed Nov. 12, 2010, the entire contents of which are both incorporated by reference herein.

TECHNICAL FIELD

The invention relates to a method of transmitting and receiving data originating from a black box on board an aircraft.

BACKGROUND

A black box, also known as a recorder, is a device installed on board aircraft that stores various flight data, sound data and optionally visual data, during the flight. The flight data originates from various sensors present on board the aircraft that collect various flight data, as well as from computers that supply flight parameters.

The data stored in a black box also comprises audio recordings and optionally video recordings of the activity inside the cockpit (discussions between crew members, etc.).

Such black boxes are generally orange in colour and fitted with a radio transmitter so that they can be located more easily, for example, following an air disaster.

However, the recovery of these black boxes following an air disaster is very complex, particularly because the great majority of the earth's surface has an uneven topology.

The recovery of black boxes from the bottom of the ocean or in crevasses within mountain chains is in fact very difficult.

However, the data contained in these devices is very important, even vital, for finding out the causes of an air disaster and working to better deal with the cause with a view to preventing the recurrence of the same type of disaster.

SUMMARY

The present invention aims to overcome this drawback by means of communicating data stored in one or more black boxes of an aircraft in flight, said communication taking place from the aircraft to the outside thereof and, more specifically, to at least one other aircraft.

According to a first aspect, the subject matter of the invention is more specifically a method of transmitting data in flight, characterized in that it comprises a step of transmitting data between a first aircraft and at least a second aircraft, the data transmitted being data stored in at least one black box on board the first aircraft.

Thus, the data from a black box or recorder is transmitted during the flight outside the aircraft in question, thus making it possible to ensure that said data will be accessible (as it is backed up on another aircraft) in the event that an air disaster occurs on said aircraft and the black box cannot be found or is unreadable.

It will be noted that the second aircraft receiving the data can, when it lands, be used to make a copy of the data on the ground.

Generally, the transmission of such data between two aircraft can take place continuously depending on the communication links possible or intermittently, regularly or otherwise, automatically or following manual triggering initiated in an emergency by a crew member.

It will be noted that the first aircraft can, depending on the circumstances, transmit black box(es) data to several other aircraft and not to just one, in order to increase the chances of transmitting reliably and therefore backing up the data.

It must be noted that the second aircraft to which the data is transmitted is not known in advance. It is selected after a decision to transmit the data has been made (for example, decision made on board the first aircraft).

The fact of transmitting the data to a second aircraft that is not a predetermined aircraft provides flexibility and reliability for the data transmission and makes it possible to ensure that the data can be transmitted at any time (by selecting a second aircraft when this is necessary) and whatever the geographical region being overflown.

The invention makes it possible to back up black box data even if the region being overflown has no satellite coverage.

Furthermore, other data can be transmitted with the black box data, for example, depending on the circumstances and applications envisaged.

According to one possible feature, the data originating from said at least one black box requires for its transmission a bandwidth of at least 100 kbits/s. Such a bandwidth is necessary for transmitting the flight data and audio data recorded in the cockpit.

In the event of transmission of video data, a bandwidth of at least 2 Mbits/s would be preferable.

According to a possible feature, the method comprises a prior step of storing the data to be transmitted in an intermediate storage space separate from said at least one black box.

It is advisable to place the data to be transmitted in a storage space separate from said at least one black box so that the data can be processed without having to modify the design of said at least one black box.

According to a possible feature, the method comprises a prior step of processing the data to be transmitted with a view to reducing the bandwidth necessary for transmitting the data.

This makes it possible to free up bandwidth on the network to enable other communications to be established or a larger volume of data to be transmitted.

According to a possible feature, the method comprises a prior step of encrypting the data to be transmitted.

This step aims to ensure the confidentiality of the data that will be transmitted between the two aircraft.

Thus, only authorized entities with appropriate decryption equipment are capable of examining the data transmitted.

An aircraft receiving black box(es) data originating from another aircraft is not generally considered to be an entity authorized to read said data and, in this regard, does not therefore have means of decryption. The data received is therefore unreadable for the receiving aircraft.

According to a possible feature, the method comprises a step of selecting a means of communication from a plurality of communication means.

It will be noted that a means of communication can be chosen preferentially for use first (for example, the radio link) and other means are envisaged if the preferred means is not for example available, or, for example, if it does not meet a predetermined criterion in relation to the new flight conditions of the first and second aircraft.

The data is transmitted for example by radio means or by any other wireless communication means (for example, mobile telephone network, WiMAX, etc.) or by satellite means.

According to another aspect, the data is transmitted on a communication network comprising mobile communication nodes that are aircraft in flight.

The transmission of such data to another aircraft constitutes a safety mechanism for said data as it thus allows a copy (backup) thereof to be made outside the aircraft in question.

According to a possible feature, the method comprises a prior step of searching on the network for at least one mobile communication node in flight with which the first aircraft (the transmitting mobile node) is capable of communicating.

According to a possible feature, the method comprises, prior to the transmission step, a step of selecting in flight at least one non-predetermined mobile communication node, said at least one node being selected from a set of mobile communication nodes in the network as a function of at least one predetermined selection criterion.

Generally, said selection aims to determine for example the "best" node, that is, the node that is most appropriate in relation to the selection criterion/criteria applied at a given moment.

This makes it possible to ensure that there will always be a (non-predetermined) receiving node within communication range of the transmitting node (the first aircraft) so that the black box(es) data can be transmitted, at any time and whatever the geographical region being overflown.

According to a feature, said at least one predetermined selection criterion is at least one of the following criteria: (an) aircraft producing a signal-to-noise ratio (signal quality) above a predetermined threshold, (an) aircraft having (a) similar or identical flight plan(s) (to maximize the availability period of the receiving aircraft), (an) aircraft belonging to the same airline or the same alliance of several airlines, (an) aircraft made by the same manufacturer, (an) aircraft within communication range, the aircraft furthest away from the first aircraft (to reduce the relative movement between the transmitting aircraft and the receiving aircraft), (an) aircraft in descent phase.

These criteria fall into different categories. Some criteria relate to communication between the aircraft (signal-to-noise ratio, aircraft flying in the same direction, aircraft within communication range, etc.), while others are less technical ((an) aircraft belonging to the same airline, made by the same manufacturer, etc.).

The most appropriate node(s) of the nodes in the network are for example identified on the basis of the signal-to-noise ratio coming from the nodes, with preference given for example to the maximum signal-to-noise ratio(s).

Alternatively, depending on the direction of the aircraft in question, preference can be given to the aircraft that will remain within the field (communication range) of the aircraft in question for longest (aircraft going in the same direction).

Thus, several aircraft in flight each constitute mobile communication nodes of a communication network and black box data is transmitted between a first and a second mobile nodes of said network, permanently or quasi-permanently, for example at a given frequency.

Further selection criteria can be applied alone or in combination with one or other of the above criteria.

According to a possible feature, the method comprises a step of requesting the establishment of a connection with the selected node, prior to the transmission of the data.

It will be noted that the node search, most appropriate node selection and connection establishment request steps are generally performed by the transmitting node.

According to another aspect, the invention relates to a method of receiving data that comprises a step of receiving in flight, from a first aircraft, data stored in at least one black box on board the first aircraft, the receiving step taking place on board a second aircraft.

According to a feature, the method of receiving data comprises a prior step of checking the availability of a storage space with a view to storing the data to be received.

It is preferable that a space be available to receive said data in order to avoid needless transmission.

Said checking is performed on the second aircraft, at the request of the first, after receipt of the connection establishment request.

According to a feature, the method comprises a step of storing the data received either in a storage space available on board the second aircraft receiving the data or, if said space is unavailable, in a storage space reserved to this end.

A further subject of the invention is a data transmission system, characterized in that it comprises means of transmitting data in flight between a first aircraft and at least a second aircraft, the data transmitted being data stored in at least one black box on board the first aircraft.

The transmission system comprises, in the form of corresponding means, one or more features of the method set out above, or even all of said features, and thus enjoys the same advantages.

A further subject of the invention is a data receiving system on board an aircraft, characterized in that it comprises means of receiving in flight, from a first aircraft, data stored in at least one black box on board the first aircraft, said system being on board a second aircraft.

According to another aspect, the invention relates to an aircraft comprising a transmission system and/or a receiving system as briefly disclosed above.

BRIEF DESCRIPTION OF THE DRAWINGS

Further features and advantages will become apparent during the following description, given as a non-limitative example only, with reference to the attached drawings, in which.

DETAILED DESCRIPTION

Figure 1:
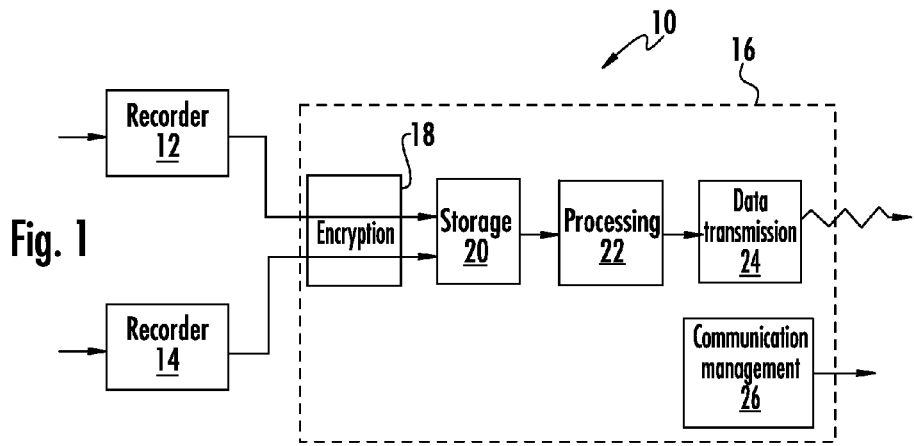
FIG. 1 is a general diagrammatical view of a transmission system according to an embodiment of the invention.

As generally shown in FIG. 1 and denoted by the reference marked 10, a system according to the invention on board an aircraft comprises two black boxes or recorders 12 and 14, one of which stores a set of data from various computers on board the aircraft, for example flight data (data reflecting the behaviour of the aircraft in flight) and the other of which stores audio data recorded in the cockpit. It will be noted that according to the invention, the aforementioned data can be distributed differently between the two black boxes, and that other types of data can be stored in one and/or the other of the boxes, such as video data recorded in the cockpit and in the aircraft environment. Furthermore, according to another variant, one or more other black boxes can be added to store the flight data and the audio data and/or other types of data, such as the aforementioned video data, differently. Hereafter, when reference is made to one and/or the other of the black boxes 12 and 14, it is understood that this can apply to a different number of black boxes and any type of data.

The system 10 also comprises a data transmission system 16.

The system 16 comprises means 18 of encrypting the data intended to be transmitted outside the aircraft originating from one or both of the black boxes 12, 14.

It will be noted that the data contained in one and/or the other of the black boxes can be identical from one black box to another, or different.

Furthermore, according to a variant, the data originating from one and/or the other of the black boxes can correspond to all of the data stored in each one of them or a selection of said data.

It will be noted that the aim of the data encryption is to ensure the confidentiality of the data that will be transmitted. In particular, said data will be transmitted to another aircraft and it must only be readable by a duly authorized entity or by a collection of authorized entities. To this end, the encryption has the effect of rendering the data unintelligible.

The encryption takes place for example by means of a public key and private key system, the use of the public key held by each of the entities in question (transmitter and receiver authorized to examine the data) being necessary for decryption.

It will be noted that threshold schemes can also be implemented to ensure greater confidentiality of the data. The principle of a threshold scheme is that several entities authorized to decrypt the data share the decryption key; the entities must all therefore agree to proceed with decryption.

The system 16 optionally comprises means of prior processing of the data originating from one and/or the other of the black boxes 12 and 14.

Data selection means can for example form part of the means 18.

It will be noted that the optional processing means ensure, for example, the optimization of the volume of data in order to reduce the bandwidth used for the transmission thereof.

As an example, the effective one-way bandwidth (non-satellite) between two aircraft is 5 Mb/s.

The system 16 also comprises a physical storage medium 20 (for example, a magnetic medium) that can be a buffer memory area or a storage space on a hard disk.

The data originating from one and/or the other of the black boxes, previously encrypted, is stored in the separate intermediate storage space 20.

The system 16 also comprises means 22 of processing the data (for example, a microprocessor, a dedicated electronic circuit, an FPGA type programmable component, etc.) from the storage space 20.

This processing can perform several functions.

Firstly, the processing makes it possible to format the data into a data frame.

This formatting consists, for example, of structuring the data in the form of a signal comprising one or more headers and a signal body containing the payload.

The processing can also comprise a second encryption, which here makes it possible to guarantee the integrity of the data to be transmitted, previously encrypted by the means 18.

This second encryption consists for example of calculating a signature from the data that has been previously encrypted. Such a signature can be obtained by calculation using a mathematical formula applied to the encrypted data. The encrypted data will then be transmitted with the signature calculated in this way.

The system 16 also comprises data transmission means 24. These means use a procedure for communication between a transmitting aircraft and a receiving aircraft that is linked to the communication protocol chosen for the communication means used. This procedure established between the two aircraft makes allows the transmitted signal to be made more robust insofar as it makes it possible to detect errors such as a packet not reaching its destination, the loss of integrity of the packet, etc. The packet can thus be retransmitted if an error is detected.

The system 16 also comprises means 26 making it possible to establish one or more connections between the aircraft comprising the system 10 and one or more aircraft.

The aircraft in flight constitute mobile nodes of a communication network.

Figure 2:
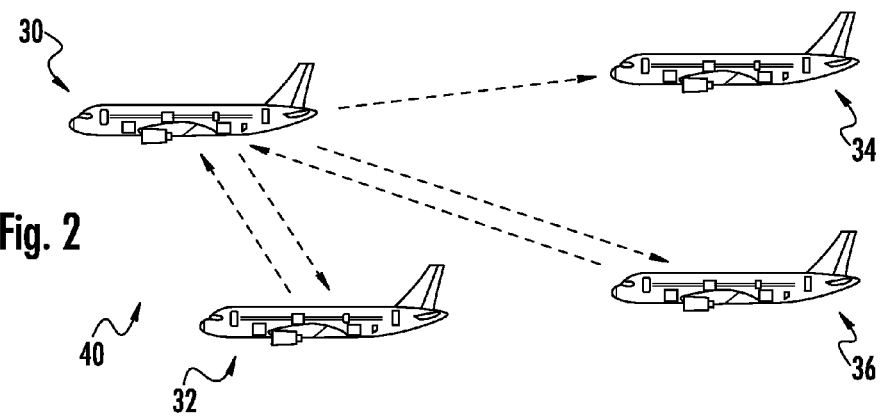
FIG. 2 is a diagrammatical view showing several aircraft constituting mobile nodes of a communication network.

FIG. 2 is a diagrammatical representation of several mobile modes 30, 32, 34, 36 of such a communication network 40.

In this figure, the aircraft represented by the mobile node 30 corresponds to the aircraft comprising the system 10 in FIG. 1.

The communication protocol used to transmit the data supports a connected connection mode.

It will be noted that the communication management means 26 first perform a phase of discovering the topology of the communication network of which the aircraft in question forms part.

During this discovery phase, the means 26 examine, by sending a signal and possibly receiving a reply signal, whether there is a mobile communication node within radio range.

The transmission takes place for example over a two-way radio communication link.

The advantage of radio-type communication lies in the width of the bandwidth and the fact that the use thereof is free of charge, or that the cost is included in a package, without any additional charges depending on consumption.

If no reply is received, optionally the means 16 can send the signal over a satellite link either in order to identify, by the return signal, one or more mobile communication nodes capable of forming a communication pair in connected mode on this communication link or in order to send it to an installation on the ground.

The advantage of satellite communication lies in the geographical coverage thereof, and in the fact that it does not depend on atmospheric conditions.

The means 26 comprise more particularly several sub-means:
  sub-means of searching for at least one mobile communication node in the network (for example, with reference to FIG. 2, the search is performed by the nodes 32, 34 and 36 of the network 40);
  sub-means of selecting a mobile communication node from the nodes found, said node meeting one or more predetermined criteria (the selection of a particular node from the nodes 32, 34 and 36 in FIG. 2 is carried out for example in relation to a predetermined criterion such as the best signal-to-noise ratio provided by said nodes; another node selection criterion can be the node in the network that remains within communication range for the longest (for example, the node 30).
  sub-means of establishing a connection with the selected node.

When a connection is established with the selected node, the transmission system 16 then proceeds to transmit the data (which has been processed as set out above) to the selected node.

It will be noted that the selected node was not determined in advance. The node 30 was only informed of the existence of the node selected to receive its data after the selection process described above.

Figure 3:
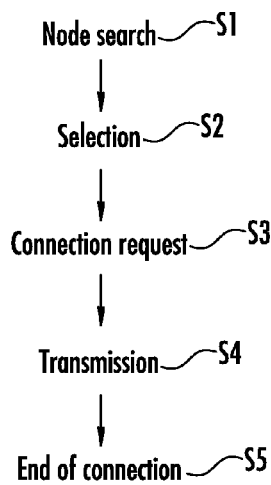
FIG. 3 is a general algorithm for establishing a connection between two aircraft.

FIG. 3 shows a mechanism for establishing a connection between the aircraft 30 and one of the aircraft 32, 34, 36 in FIG. 2.

As shown in FIG. 3, the algorithm comprises a first step S1 of searching for one of more mobile communication modes in the network 40.

As indicated above, during this search step, the type of communication network that will be used for transmission is selected, namely a radio communication network, an optical communication network, or another type of wireless communication network, or even a satellite communication network.

The search for the best node is performed for each physical layer implemented (radio, satellite, optical, etc.). The best physical layer is selected, for example, in the software the algorithm for which is shown in FIG. 3. An order of preference of the physical layer is for example defined. For example, as long as radio communication is available (i.e. the nodes are within range and available for communication), this medium is chosen; otherwise the 4G network is chosen, and failing this, the satellite network.

In each of the three steps in the example, the search for the best node takes place.

As in the example in FIG. 2, a radio communication type network has for example been chosen and the most appropriate node(s) must then be chosen in order to ensure the reliability and to optimize the data interchanges between the node 30 and this/these node(s).

The following selection step S2 provides for the selection of one or more nodes that meet one or more predetermined criteria.

One of the predetermined criteria is for example the maximization of the signal-to-noise ratio of the signal from a node.

Another criterion can for example lie in the aircraft that has/have similar flight plans to that of the aircraft 30 in order to maximize the availability time of the node(s).

Searching for aircraft that belong to the same airline as the aircraft 3 can also be used as a criterion.

One or several of these criteria in combination can be used.

It will be noted that the search and selection steps are performed either periodically or on demand, for example following a loss of connection with an aircraft.

The algorithm in FIG. 3 comprises a step S3 of requesting connection with the previously selected node(s).

The aim of this connection establishment request is to inform the future receiving node that the transmitting node 30 wishes to transmit sensitive information.

When the node receiving the connection request accepts it on the basis of conditions specific thereto (the node is not, for example, already actively connected to this aircraft or another aircraft, one or more storage spaces are available in the receiving node, etc.), the connection is established. The step of transmitting the data from the aircraft 30, for example, to the aircraft 32 accepting the connection then takes place (step S4).

The algorithm ends with step 5, which ends the connection.

It must be noted that, on selection of a new best receiving node, two options can be envisaged:

the first option consists of replacing one of the poorer connections still active with the aircraft 30 by a connection with the new node that has just been identified;

the second option consists of keeping this new best node as the backup node and the connection thereto will only be made after the existing communication with a so-called current node has been lost.

Figure 4:
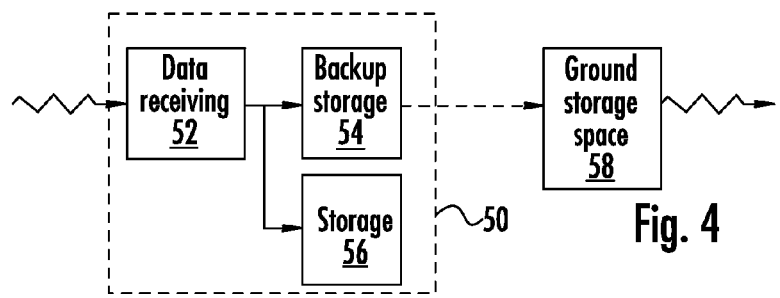
FIG. 4 is a general diagram of a receiving system according to an embodiment of the invention.

FIG. 4 is a diagrammatical representation of a data receiving system 50 on board an aircraft. The aircraft in question is for example the above-mentioned aircraft 32, which is the best candidate for retrieving recorder or black box data from the aircraft 30 in light of the selection criterion put in place (for example, geographical proximity).

The system 50 comprises means 52 of receiving the data transmitted by the aircraft 30 that are, for example, radio, optical, satellite, etc. receiving means depending on the physical communication link used.

The system 50 also comprises a backup storage space 54 and a reserved storage space 56 in the event that the space 54 is unavailable. The data received is then stored in the appropriate space.

It will be noted that the aircraft 32 comprises the same means as those shown in FIG. 1, which makes it possible, if the type of communication permits (two-way communication), for the aircraft 32 to transmit its data to the aircraft 30.

When the aircraft 32 lands, the data from the aircraft 30 is then retrieved, stored for a limited period, and optionally centralized by the airline or a region or an airport with a view to possible use after decryption. For example, a ground storage space 58 can store the data transmitted from the second aircraft after it has landed.

Figure 5:
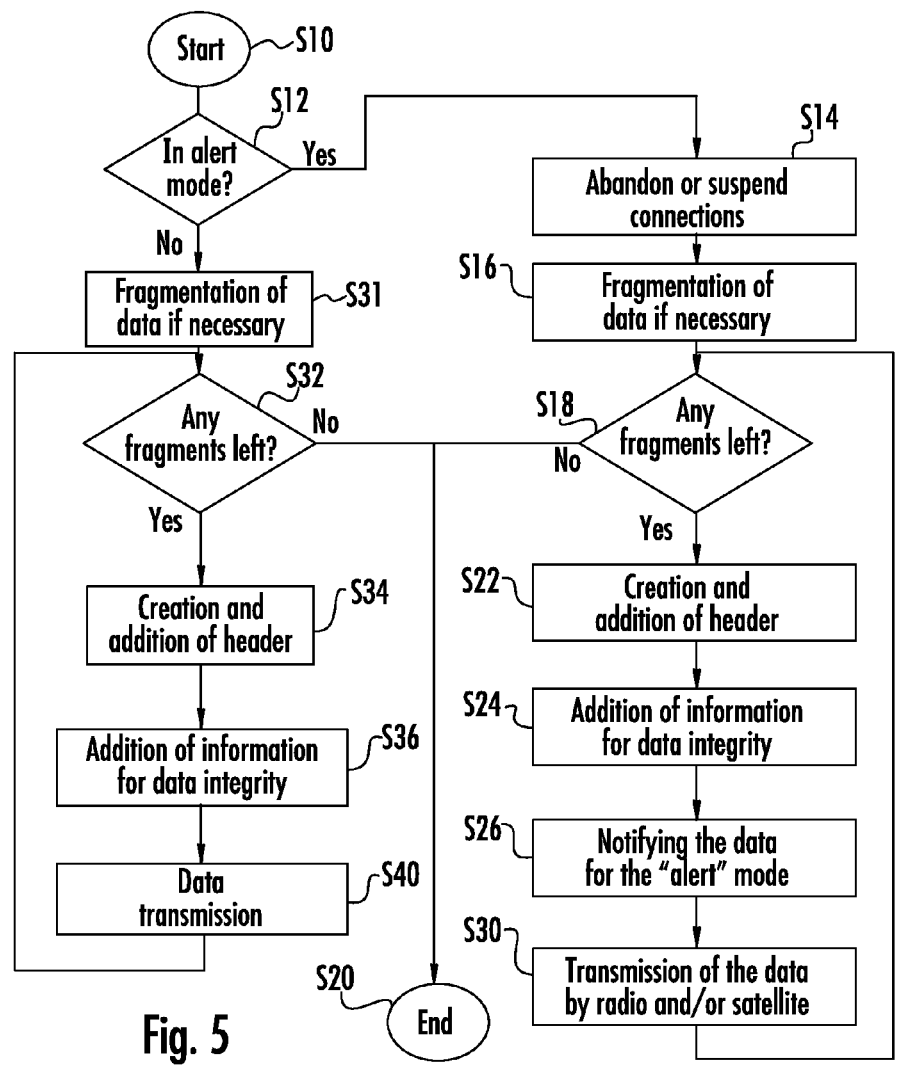
FIG. 5 is an algorithm for a data transmission method according to the invention.

FIG. 5 shows an algorithm for a data transmission method according to the invention.

This algorithm is implemented on board the aircraft that will transmit data present in its black boxes or recorders.

The algorithm is for example implemented by the system 16 in FIG. 1 after retrieval of the data originating from the black boxes or recorders 12 and 14.

This algorithm comprises several steps including a first algorithm initialization step, marked S10.

The next step S12 of the algorithm is a test to check whether or not the aircraft is in alert mode.

Alert mode characterizes the fact that the aircraft is faced with one or more critical problems. It is a mode that defines that outgoing communications from this aircraft take priority over other transmissions that are not in this mode.

This mode can be activated manually or automatically and the aim thereof is to transmit the data (or certain selected data) contained in the black boxes to an aircraft or a set of aircraft located nearby (for example, the aircraft 32, 34 and 36 in FIG. 2) and force recording by one or more of these aircraft in this region.

It will be noted that the data is transmitted, for backup purposes, via a means of communication chosen in relation to a predetermined criterion such as its availability or because it constitutes a preferred means (e.g.: radio).

However, if this means cannot be used for any reason (e.g.: unavailability of the means and for example momentary loss of the communication network), then the use of other means of communication is envisaged for the data transmission.

For example, another means of communication can be selected automatically as a second preferred means (for example, satellite).

As will be seen below with reference to the procedure for receiving data by a receiving aircraft (node), some of the aircraft detecting information in alert mode are obliged to back up this data, as well as the geographical position of the aircraft in difficulty, to a backup storage space.

Provision is made for the communication protocol to collect information from the aircraft in difficulty.

It must therefore be noted that in alert mode, the data transmission system of the aircraft in question (for example the aircraft 30 in FIG. 2) can be capable of transmitting black box data via a satellite link to a station on the ground, in order to warn the emergency services and the investigation team as soon as possible.

When alert mode is detected, several options can be envisaged.

Firstly, it is possible to provide for a change in the flight plan of an aircraft located in the geographical region in which the aircraft in difficulty is situated, so that the former can follow the latter for as long as possible and collect flight information from this aircraft, together with its position. As provided for in step S14 in FIG. 5, in alert mode the suspension or abandonment of existing connections with aircraft can be envisaged, with the exception of connections already established from one or more aircraft in alert mode, in order to free up bandwidth. This makes it possible to provide the aircraft in difficulty with as much bandwidth as possible and thus optimize the collection of data coming from that aircraft.

It will also be noted that in order to optimize the collection time of the data from the aircraft in difficulty, the broadcasting of this data to several aircraft instead of just one can be envisaged, or the broadcasting of this data using several different physical layers (radio, optical, satellite, etc.).

When the decision is made to transmit black box data outside the aircraft, the data is retrieved by the means 22 from the storage space 20.

The next step S16 provides for the fragmentation of the data to be transmitted into data packets, each made up of a header and a payload containing the useful data.

This fragmentation is performed depending on the physical layer and communication protocol used.

All of the packets are thus transmitted to the same recipient.

It will be noted that, in the event that the data is broadcast to several aircraft, the same packets will for example be transmitted in parallel to all of those aircraft.

The next step S18 is a test used to determine whether there are any data fragments left to be transmitted. If there are no more fragments awaiting transmission, the algorithm is then ended in step S20.

If there are fragments left to be transmitted, then step S18 is followed by a step S22 consisting of creating and adding a header to the data signal to be transmitted (packet).

The header(s) created in this way are useful for managing the data.

As an example, it comprises flags or markers indicating the presence of specific information such as information used to identify the aircraft (code), etc.

The algorithm comprises a next step S24 for adding information to the signal to be transmitted in order to guarantee the integrity of the data to be transmitted.

The processing performed to ensure the integrity of the data is the processing already described with reference to FIG. 1 and is performed by the means 22.

The next step S26 makes provision for notifying, in the signal to be transmitted, the indication that the information that the data to be transmitted comes from an aircraft, configured in alert mode. This indication is for example added to the header created in step S22.

The next step S30 makes provision for the data to be transmitted in packets on the physical link (either by radio link, satellite link, optical link or 4G link, etc.), as already described above, after execution of the algorithm in FIG. 3.

The topology discovery mechanism described with reference to FIG. 3 is suitable for a radio network with mobile nodes as well as a satellite network and must take into account the performance aspects in order to avoid excessive consumption of bandwidth and local resources.

It will be noted in this regard that it can be envisaged, for an aircraft wishing to establish a connection, that it broadcasts a connection request in accordance with a timer operating periodically or pseudo-periodically.

It will be noted, furthermore, that a connection is established for example at least in one of the protocol layers.

In the embodiment, the connection is preferably established in a single layer as several connections on different protocol levels make the transmission system more complex and less efficient.

A very dense radio network such as the network of the global aircraft fleet in flight at a given time (t) must be capable of withstanding a very heavy load without affecting its operation.

To this end, and to avoid potential blockages (for example, saturation of the frequency band) the number of connections per aircraft is limited.

Thus, if N denotes the number of outgoing connections, N' the number of incoming connections, M the total number of connections and K the number of backup locations, the applicant has established the following relationships:

$$N'=N$$

$$M=2\times N$$

$$K=M+1,$$

the digit "1" denotes a storage location that is always reserved for the storage of data from an aircraft in alert mode.

In the embodiment, two outgoing connections and two incoming connections are used.

One of the means of communication used to transmit the data uses a two-way radio communication network to transmit and receive data between mobile nodes.

Such a network is not necessarily dedicated to the use planned for the implementation of the invention, and can also be used to perform one or more other functions of the aircraft.

The system used is for example a Wi-Fi or WiMAX system that provides the bandwidth, the range (maximum distance within which communication is physically possible) and the properties necessary for the implementation of the invention (for example, the technology must make it possible to provide the required level of security, manage service quality, etc.).

It will be noted that the transmission step S30 is followed by the step S18 already described above in order to check whether there are any data fragments left to be transmitted.

Returning to the test step S12 already described above, when alert mode is not identified, the next step S31 makes provision for the fragmentation of the data to be transmitted if necessary.

This step is identical to step S16 already described above.

Step S31 is followed by a test step S32 used to determine whether there are any data fragments left to be transmitted.

If not, this step is followed by step S20, which ends the transmission algorithm.

If there are, step S32 is followed by a step S34 that makes provision for creating and adding one or more headers to the data signal to be transmitted.

This step is identical to step S22 already described above.

The next step of adding information to guarantee the integrity of the data (S36) is identical to step S24 already described above.

The next step S40 makes provision for transmitting the data configured in the previous steps on a physical link as already described above in step S30.

The data is thus transmitted to the aircraft previously selected as the receiving node in the network that is most suitable for the transmission.

If several valid aircraft have been detected, that is, several aircraft have been selected as meeting one or more predetermined criteria, a first connection is made with the most suitable of these aircraft.

As a priority, the black box data transmitted to this aircraft is that which is most important in the event of an investigation, that is, the most recent.

It must be noted that, as far as possible, the data is transmitted in real or quasi-real time, that is, as and when the data is acquired by the black box(es).

A second connection is for example made with another aircraft selected for transmitting older data, for example data several minutes old (for example, t−15 min.).

The second connection is for example established with the second "best" pair found during the search for mobile nodes in the network.

It will be noted that transmission priority is granted to the data obtained in real time.

Thus, as soon as the physical link is lost or a better link is detected, the transmission algorithm is executed in order to re-establish real-time data transmission.

This takes place even if another active transmission has to be ended as a result.

Step S40 is then followed by the test step S32 already described above. It will be noted that the hardware platform used in the transmission system 16 in FIG. 1 is for example a PC-type open platform, the trust level of which is improved by the use of a hardware encryption component such as for example a TPM (Trusted Platform Module) defined by the TCG (Trusted Computing Group).

Figure 6A:
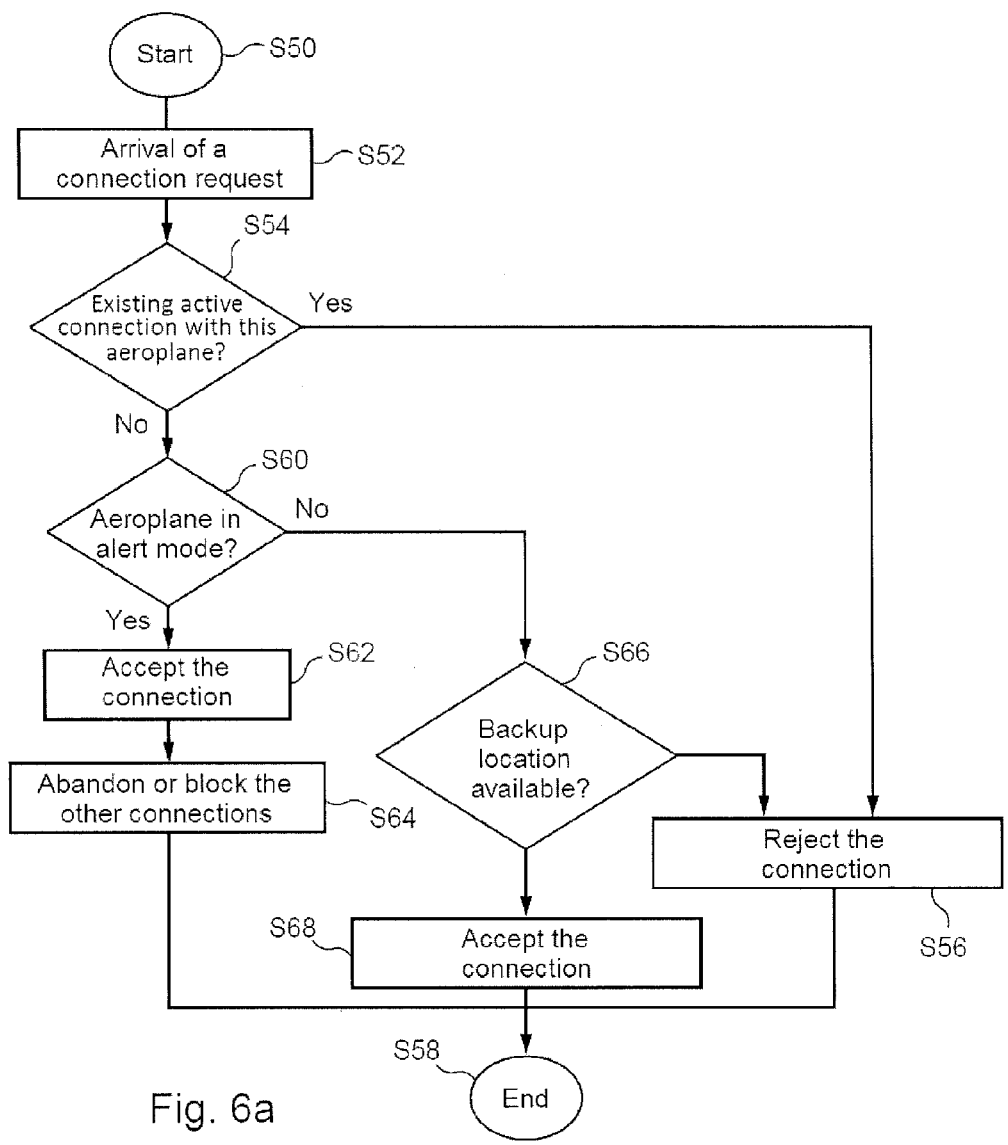
FIGS. 6a and 6b are two algorithms for a connection method and a data receiving method according to the invention respectively.

FIG. 6a shows an algorithm for part of a method for receiving data according to the invention.

This algorithm is implemented in an aircraft of the mobile network as shown in FIG. 2 and for example in the aircraft 32 selected by the aircraft 30 as being the best communication partner.

This algorithm starts with an algorithm initialization step S50.

The algorithm comprises a step S52 of receiving a connection request from the aircraft 30 and is followed by a test step S54.

During this step, it is checked whether a connection is already active with the aircraft 30 from which the connection request originates.

If so, this step is followed by a step S56 of rejection of the connection and the algorithm is then ended by a step S58.

If, on the other hand, there is no active connection with the aircraft 30, step S54 is followed by a step S60.

During this step, a test is performed to determine whether or not the aircraft 30 is in alert mode.

If so, this step is followed by a step S62 for accepting the connection request, then a step S64 for ending other current communications (abandoning or blocking the other connections existing between the selected aircraft 32 and other aircraft).

It will be noted that alert mode is defined in the aircraft from which the connection request originates, for example, on the basis of the detection of certain predetermined events that can be linked to the detection of critical faults and/or are linked to worrying flight parameter measurements (for example, exceeding predetermined thresholds).

Alert mode is thus chosen in order to prioritize the receipt of the black box data transmitted by any mobile node located in a geographical region allowing the data to be received.

Step S64 is followed by a step S58 ending the algorithm.

Returning to step S60, when the result of the test performed shows that the aircraft is not configured in alert mode, a next test step S66 is performed.

During this step, it is determined whether there is storage space available on board the aircraft (backup location).

If not, the connection is rejected (step S56).

Otherwise, when storage space is available, the connection is accepted (step S68).

It will be noted that when the aircraft from which the connection request originates is not configured in alert mode, the receipt and storage of data coming from that aircraft are not prioritized if no storage space is available.

As will be seen below with reference to FIG. 6b, this is not the case when alert mode is detected.

Figure 6B:
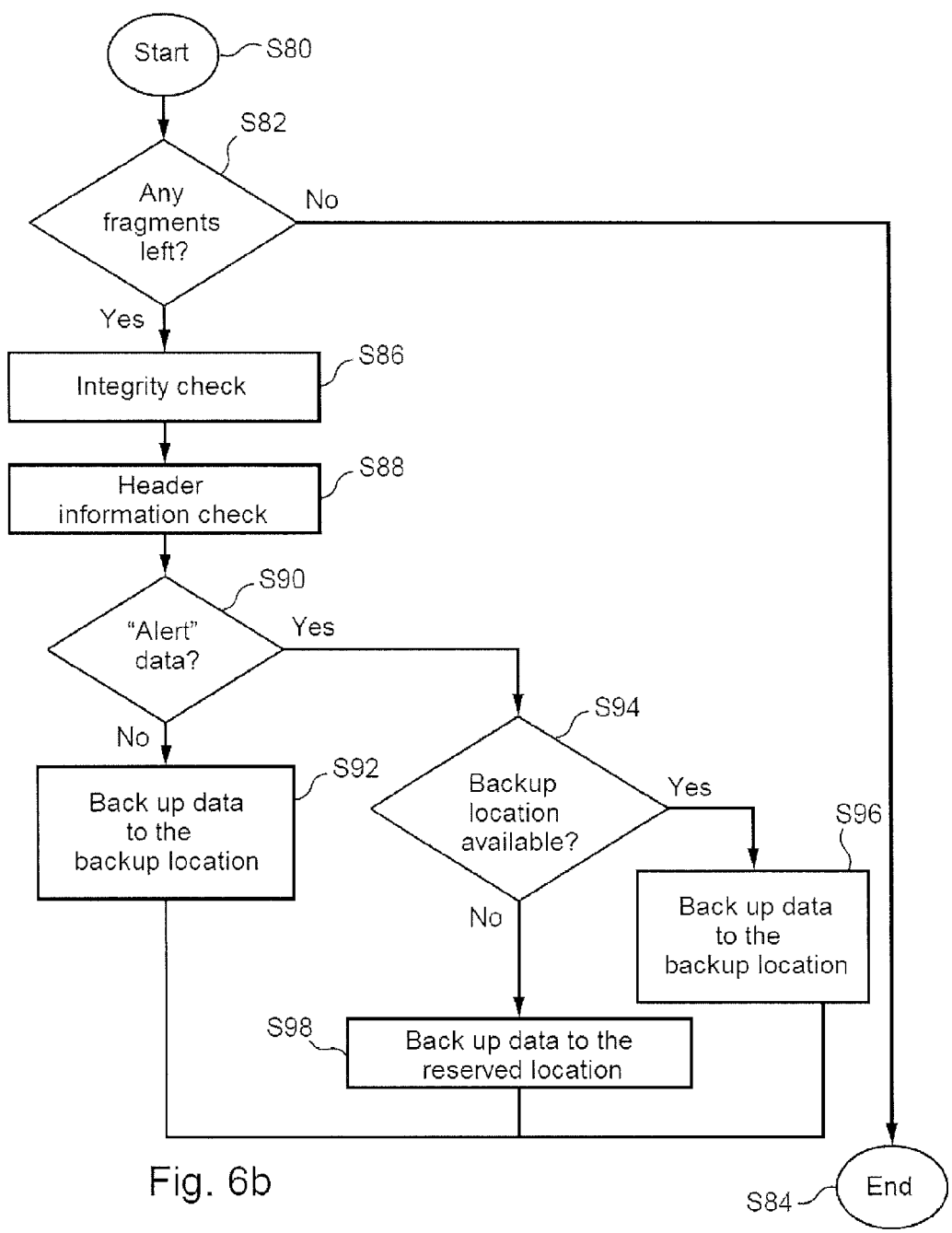

The algorithm in FIG. 6b gives more specific details of the backup process for the black box data collected on board the selected receiving aircraft.

This algorithm starts with an initialization step S80, followed by a test step S82 that checks for the presence of data fragments (packets) to receive.

If there are none, this step is followed by step S84 ending the algorithm.

Otherwise, if there are data fragments left to receive, then this step is followed by a step S86 of checking the integrity of the data received.

The means put in place to check the integrity of the data are known to a person skilled in the art (for example, use of a signature for example in the MD5 or RSA algorithms). If the data received is not identical to the data transmitted, provision is made for processing so that the transmitting aircraft is alerted and the data can therefore be retransmitted.

Step S86 is followed by a step S88 for checking the information in the header(s) of the data signal received.

During this step, the identification of any markers or flags indicating to the receiving node that the transmitting node is an aircraft in difficulty takes place.

The checking step is used for example to identify other information such as the transmitter's identifier, receiver's identifier, packet serial number, etc. This information is useful for organizing and subsequently finding the data if necessary.

Step S88 is followed by a test step S90.

During this step, depending on the results of step S88, it is determined whether or not the aircraft from which the black box data originates is in alert mode.

If not, this step is followed by a step S92 for storing the data received in an available storage space (backup location).

Otherwise, when the result of the test performed in step S90 shows that the data originates from an aircraft in alert mode, then this step is followed by a test step S94.

During this step, it is checked whether there is storage space available on board the aircraft. In particular, it is checked whether the standard storage space is available as a priority to avoid "filling up" the reserved area.

If standard storage space is available, then step S94 is followed by a step S96 for storing the black box data received in this space (backup location).

If, conversely, no standard storage space is available, then step S94 is followed by a step S98 for backing up the black box data to a reserved storage space (dedicated location).

The existence of specific available storage space is thus guaranteed so that data can always be received from an aircraft in alert mode.

The invention claimed is:

1. An aircraft data transmission method, the method comprising:
encrypting data collected on a first aircraft in flight, wherein the encrypted data comprises flight data, sound data and optionally visual data;
storing the encrypted data in at least one black box on board the first aircraft; and
transmitting, by a transmitter, the encrypted data from the at least one black box of the first aircraft which is in flight to at least a second aircraft that is also in flight, wherein the first aircraft is related to the second aircraft, the encrypted data in the at least one black box on board the first aircraft is confidential and unintelligible to the second aircraft, and the second aircraft is unable to decrypt the transmitted encrypted data in the at least one black box on board the first aircraft.

2. The method according to claim 1, wherein the data originating from the at least one black box requires for its transmission a bandwidth of at least 100 kbits/s.

3. The method according to claim 1, further comprising selecting one communication network from a plurality of communication networks.

4. The method according to claim 3, wherein the plurality of communication networks comprise radio, satellite or any other wireless communication network.

5. The method according to one of claim 1, wherein the data is transmitted on a communication network comprising a set of mobile communication nodes that include aircrafts in flight.

6. The method according to claim 5, further comprising selecting in flight at least one non-predetermined mobile communication node, the at least one node being selected from the set of mobile communication nodes in the network as a function of at least one predetermined selection criterion.

7. The method according to claim 6, wherein the at least one predetermined selection criterion is at least one of the following criteria: the second aircraft producing a signal-to-noise ratio above a predetermined threshold, the second aircraft having a similar or identical flight plan(s), the second aircraft belonging to a same airline or a same alliance of several airlines, the second aircraft within communication range, the second aircraft farthest away from the first aircraft, and the second aircraft in descent phase.

8. The method according to claim 6, further comprising requesting establishment of a connection with the at least one selected non-predetermined best node, prior to transmitting the data.

9. The method according to claim 6, wherein the at least one predetermined selection criterion further comprises the second aircraft being made by a same manufacturer.

10. An aircraft data receiving method, the method comprising:
encrypting data collected on a first aircraft in flight, wherein the encrypted data comprises flight data, sound data and optionally visual data;
storing the encrypted data in at least one black box on board the first aircraft in flight; and
receiving, on board by a receiver at least a second aircraft also in flight, the encrypted data stored in the at least one black box of the first aircraft, wherein the first aircraft is related to the second aircraft, the encrypted data in the at least one black box on board the first aircraft is confidential and unintelligible to the second aircraft, and the second aircraft is unable to decrypt the received encrypted data in the at least one black box on board the first aircraft.

11. The method according to claim 10, further comprising checking availability of a storage space on board the second aircraft with a view to storing the data to be received.

12. The method according to claim 10, further comprising storing the data received either in an available storage space or in a reserved storage space.

13. An aircraft data transmission system, comprising:
a transmitter on board a first aircraft configured to transmit encrypted data from the first aircraft to at least one second aircraft, wherein the encrypted data comprises flight data, sound data and optionally visual data; and
at least one black box on board the first aircraft configured to store the encrypted data of the first aircraft for the transmission of the encrypted data from the first aircraft to the at least one second aircraft, wherein the first aircraft is related to the at least one second aircraft, the encrypted data in the at least one black box on board the first aircraft is confidential and unintelligible to the at least one second aircraft, and the at least one second aircraft is unable to decrypt the transmitted encrypted data in the at least one black box on board the first aircraft,
wherein both the first aircraft and the at least one second aircraft are in flight.

14. An aircraft data receiving system, comprising:
a receiver on board at least a second aircraft in flight configured to receive encrypted data from a first aircraft to the second aircraft, wherein the encrypted data comprises flight data, sound data and optionally visual data; and
at least one black box configured to store the encrypted data on board the first aircraft which is also in flight, wherein the first aircraft is related to the second aircraft, the encrypted data in the at least one black box on board the first aircraft is confidential and unintelligible to the second aircraft, and the second aircraft is unable to decrypt the received encrypted data in the at least one black box on board the first aircraft.

* * * * *